United States Patent
Yamaoka et al.

(10) Patent No.: US 7,270,858 B2
(45) Date of Patent: Sep. 18, 2007

(54) INCLINED OPTICAL COMPENSATION FILM, METHOD FOR PRODUCING THE SAME AND LIQUID CRYSTAL DISPLAY INCLUDING THE SAME

(75) Inventors: Takashi Yamaoka, Ibaraki (JP); Nao Murakami, Ibaraki (JP); Hiroyuki Yoshimi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 337 days.

(21) Appl. No.: 10/504,639

(22) PCT Filed: Feb. 18, 2003

(86) PCT No.: PCT/JP03/01680

§ 371 (c)(1),
(2), (4) Date: Aug. 12, 2004

(87) PCT Pub. No.: WO03/071318

PCT Pub. Date: Aug. 28, 2003

(65) Prior Publication Data

US 2005/0117099 A1    Jun. 2, 2005

(30) Foreign Application Priority Data

Feb. 19, 2002    (JP)    ............... 2002-040889

(51) Int. Cl.
*G02F 1/13363* (2006.01)
(52) U.S. Cl. .............. 428/1.3; 428/1.1; 349/117; 349/118
(58) Field of Classification Search ........... 428/1.1, 428/1.3; 349/117–121
See application file for complete search history.

(56) References Cited

U.S. PATENT DOCUMENTS 5,245,456 A    9/1993    Yoshimi et al.

(Continued)

FOREIGN PATENT DOCUMENTS

EP    1096301    5/2001

(Continued)

OTHER PUBLICATIONS

Retardation film laminated with polarizing film NRF and NRZ series. Product Sheet [online]. Nitto Denko Corporation, 2001-2006 [retrieved on Sep. 25, 2006]. Retrieved from the internet:<URL:www.nitto.com/product/datasheet/optical/004/index.html>.*

(Continued)

*Primary Examiner*—Terrel Morris
*Assistant Examiner*—Sow-Fun Hon
(74) *Attorney, Agent, or Firm*—Westerman, Hattori, Daniels & Adrian, LLP.

(57) ABSTRACT

An inclined optical compensation film formed from a non-liquid-crystal polymer, which is useful in a TN mode liquid crystal display. A substrate is coated with a non-liquid-crystal polymer to thereby form a coating film; the non-liquid-crystal polymer of the coating film is inclined and aligned; and the coating film is solidified, thereby forming an inclined optical compensation film. The non-liquid-crystal polymer can be inclined and aligned by, for example, applying external force, such as wind blowing, to the coating film. This inclined optical compensation film exhibits, for example, a birefringence ($\Delta n$) ranging from 0.001 to 0.5 and thus is useful in a TN mode liquid crystal display, etc.

27 Claims, 2 Drawing Sheets

U.S. PATENT DOCUMENTS

| | | | |
|---|---|---|---|
| 5,344,916 A | 9/1994 | Harris et al. | 528/353 |
| 5,395,918 A | 3/1995 | Harris et al. | 528/353 |
| 5,480,964 A | 1/1996 | Harris et al. | 528/353 |
| 5,493,431 A * | 2/1996 | Baba et al. | 349/117 |
| 5,518,783 A | 5/1996 | Kawata et al. | 428/1 |
| 5,580,950 A | 12/1996 | Harris et al. | 528/350 |
| 5,583,679 A * | 12/1996 | Ito et al. | 349/118 |
| 5,694,187 A | 12/1997 | Abileah et al. | 349/120 |
| 5,699,136 A | 12/1997 | Arakawa et al. | 349/118 |
| 5,750,641 A | 5/1998 | Ezzell et al. | 528/353 |
| 5,777,709 A * | 7/1998 | Xu | 349/120 |
| 5,805,253 A * | 9/1998 | Mori et al. | 349/118 |
| 5,895,106 A * | 4/1999 | VanderPloeg et al. | 349/118 |
| 5,990,997 A * | 11/1999 | Jones et al. | 349/120 |
| 5,995,184 A | 11/1999 | Chung et al. | 349/118 |
| 6,074,790 A | 6/2000 | Ezzell et al. | 428/1.3 |
| 6,181,400 B1 * | 1/2001 | Yang et al. | 349/117 |
| 6,356,325 B1 * | 3/2002 | Shimoshikiryo | 349/121 |
| 2002/0015807 A1 | 2/2002 | Sugino | |

FOREIGN PATENT DOCUMENTS

| | | |
|---|---|---|
| EP | 1 160 591 | 12/2001 |
| JP | 06-214116 A | 8/1994 |
| JP | 7-110406 | 4/1995 |
| JP | 2565644 | 10/1996 |
| JP | 2692035 | 9/1997 |
| JP | 2802719 | 7/1998 |
| JP | 10-508048 | 8/1998 |
| JP | 11-125716 | 5/1999 |
| JP | 2000-105315 | 4/2000 |
| JP | 2000-511296 | 8/2000 |
| JP | 2001-49110 | 2/2001 |
| JP | 2001-343529 | 12/2001 |
| JP | 2002-6136 | 1/2002 |
| JP | 2002-14233 | 1/2002 |
| WO | WO96/11967 | 4/1996 |
| WO | WO97/44704 | 11/1997 |

OTHER PUBLICATIONS

Translation of International Preliminary Examination Report of PCT/JP03/01680.

* cited by examiner

INCLINED OPTICAL COMPENSATION FILM, METHOD FOR PRODUCING THE SAME AND LIQUID CRYSTAL DISPLAY INCLUDING THE SAME

TECHNICAL FIELD

The present invention relates to an inclined optical compensation film used for improving viewing angle characteristics, a method for producing the same and various image display apparatuses using the same.

BACKGROUND ART

Conventionally, liquid crystal displays have been provided with various retardation films for optical compensation, for example, birefringent layers formed of a polymer having a negative birefringence. As examples of the polymer having a negative birefringence, polyimide etc. are disclosed in various documents (for example, U.S. Pat. No. 5,344,916, U.S. Pat. No. 5,395,918, U.S. Pat. No. 5,480,964, U.S. Pat. No. 5,580,950, U.S. Pat. No. 5,694,187, U.S. Pat. No. 5,750,641 and U.S. Pat. No. 6,074,709). However, these negative birefringent layers can be used as an inclined optical compensation film in a liquid crystal display whose display system is a vertically aligned (VA) mode but cannot achieve a sufficient effect as an inclined optical compensation film in a twisted nematic (TN) mode liquid crystal display.

On the other hand, examples of inclined optical compensation films reported to be useful for the TN mode liquid crystal displays include a film containing a low molecular weight liquid crystal that is inclined and aligned in a polymer matrix (see Japanese Patent 2565644, for example) and a film obtained by forming an alignment layer on a support and inclining and aligning a discotic liquid crystal thereon so as to polymerize this liquid crystal (see Japanese Patents 2692035 and 2802719, for example).

DISCLOSURE OF INVENTION

However, although there have been many reports on these inclined optical compensation films for TN mode obtained by inclining and aligning liquid crystal materials, these films also have some problems. For example, their production processes are complicated because the selection of liquid crystal materials (the selection of liquid crystal materials that are inclined and aligned easily by utilizing the difference in surface energy at an interface with the air) and the control of the angle of inclination of the liquid crystal material (the control of the inclination angle by a surfactant) are necessary and an alignment substrate is indispensable. Further, since there are various controllable factors, it is difficult to change the inclination angle or the retardation (see JP 12(2000)-105315 A, for example).

Accordingly, the object of the present invention is to provide a new inclined optical compensation film instead of a conventional inclined optical compensation film using a liquid crystal material, more specifically, to provide an incline-aligned-type inclined optical compensation film useful for TN mode liquid crystal displays or the like.

In order to achieve the above-mentioned object, the present invention provides an optical compensation film containing a non-liquid crystal polymer, which can be first and second inclined optical compensation film as described below.

A first inclined optical compensation film according to the present invention is an inclined optical compensation film containing a non-liquid crystal polymer. The non-liquid crystal polymer is inclined and aligned, a retardation value measured from a direction of a measuring axis varies asymmetrically between a + side and a − side of a measuring angle with respect to the retardation value at 0°, where the 0° corresponds to a normal line of a surface of the inclined optical compensation film and the measuring angle denotes an angle between the normal line and the measuring axis, and a birefringence ($\Delta n$) represented by the equation below ranges from 0.001 to 0.5, $$\Delta n=[\{(nx+ny)/2\}-nz] \doteq d/d$$

where $\Delta n$ represents the birefringence of the inclined optical compensation film, nx, ny and nz respectively represent refractive indices in directions of an X axis, a Y axis and a Z axis in the inclined optical compensation film, with the X axis being an axial direction exhibiting a maximum refractive index within the surface of the inclined optical compensation film, the Y axis being an axial direction perpendicular to the X axis within the surface and the Z axis being a thickness direction perpendicular to the X axis and the Y axis, and d represents a thickness of the inclined optical compensation film.

A second inclined optical compensation film according to the present invention is an inclined optical compensation film containing a non-liquid crystal polymer. The non-liquid crystal polymer is inclined and aligned, a retardation value measured from a direction of a measuring axis varies asymmetrically between a + side and a − side of a measuring angle with respect to the retardation value at 0°, where the 0° corresponds to a normal line of a surface of the inclined optical compensation film and the measuring angle denotes an angle between the normal line and the measuring axis (including 0°), and the non-liquid crystal polymer is at least one polymer selected from the group consisting of polyamide, polyimide, polyester, polyetherketone, polyamide imide and polyesterimide.

As a result of keen examination, the inventors of the present invention newly found that an inclined optical compensation film that was completely different from the conventional film was formed by selecting a non-liquid crystal polymer instead of a liquid crystal material as a forming material and further using a non-liquid crystal polymer such as polyimide among the above non-liquid crystal polymer, thus arriving at the present invention. As described above, the inclined optical compensation film that has an inclined non-liquid crystal polymer and satisfies the above-noted condition is useful for, for example, a TN mode liquid crystal display or the like similarly to a conventional inclined optical compensation film formed of a liquid crystal material (an inclined retardation film). Furthermore, since the inclined optical compensation film according to the present invention is formed of a non-liquid crystal polymer, its optical characteristics such as retardation also can be varied by stretching or shrinking, which will be described later, even after it is formed unlike a conventional liquid crystal material, which is to be solidified inevitably. Thus, it is possible to adjust the optical characteristics according to its intended use, for example, to provide even better optical characteristics, so that the inclined optical compensation film of the present invention can be applied to a wider range of purposes than a conventional inclined optical compensation film, leading to cost reduction. Moreover, since the use of the above-mentioned polyimide as the non-liquid crystal polymer satisfies the above-noted range of birefringence (Δn), an excellent visual angle compensation effect can be achieved, for example, a favorable contrast can be obtained over a wide viewing angle. Therefore, the optical compensation film according to the present invention can be used as a new retardation film that is useful for various image display apparatuses such as liquid crystal displays.

In the present invention, the paths (locus) of measuring axes including a normal line form a single plane, and the direction in which each measuring axis is inclined from the normal line is not particularly limited.

Next, a method for producing an inclined optical compensation film according to the present invention includes coating a base with at least one non-liquid crystal polymer selected from the group consisting of polyamide, polyimide, polyester, polyetherketone, polyamide imide and polyesterimide, thereby forming a coating film, and inclining and aligning the non-liquid crystal polymer in the coating film, thereby forming an inclined optical compensation film. The non-liquid crystal polymer is inclined and aligned by applying an external force to the coating film so that the non-liquid crystal polymer is inclined and aligned.

Unlike a conventional liquid crystal material, the non-liquid crystal polymer mentioned above can form a coating film that has its own property of allowing molecules to be aligned so as to exhibit an optically negative uniaxiality (nx>nz), (ny>nz) regardless of the alignment property of a base. Thus, the base is not necessarily limited to an alignment substrate or a substrate provided with an alignment layer. Also, simply by applying an external force to a coating film to be formed as above, the non-liquid crystal polymer constituting the coating film can be inclined and aligned. In this manner, it is possible to obtain a new inclined optical compensation film having excellent optical characteristics as described above.

PREFERRED MODE FOR CARRYING OUT THE INVENTION

An inclined optical compensation film according to the present invention is an inclined optical compensation film containing a non-liquid crystal polymer as described above. The non-liquid crystal polymer is inclined and aligned, and a retardation value measured from a direction of a measuring axis varies asymmetrically between a + side and a − side of a measuring angle with respect to the retardation value at 0°, where the 0° corresponds to a normal line of a surface of the inclined optical compensation film and the measuring angle denotes an angle between the normal line and the measuring axis (0°). The first inclined optical compensation film according to the present invention is further characterized in that a birefringence (Δn) represented by the equation below ranges from 0.001 to 0.5, $$\Delta n = [\{(nx+ny)/2\} - nz] \cdot d/d$$

where Δn represents the birefringence of the inclined optical compensation film, nx, ny and nz respectively represent refractive indices in directions of an X axis, a Y axis and a Z axis in the inclined optical compensation film, with the X axis being an axial direction exhibiting a maximum refractive index within the surface of the inclined optical compensation film, the Y axis being an axial direction perpendicular to the X axis within the surface and the Z axis being a thickness direction perpendicular to the X axis and the Y axis. Further, the second inclined optical compensation film according to the present invention is further characterized in that the non-liquid crystal polymer is at least one polymer selected from the group consisting of polyamide, polyimide, polyester, polyetherketone, polyamide imide and polyesterimide.

Figure 1:
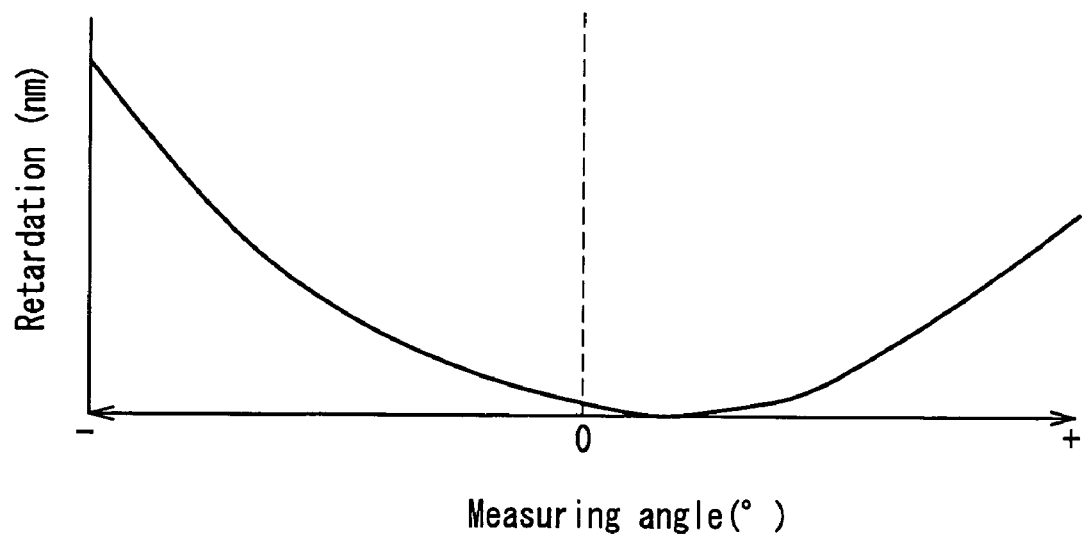
FIG. 1 is a graph showing the relationship between an angle of measuring retardation and a retardation value in an inclined optical compensation film according to the present invention.

In the present invention, "a retardation value measured from a direction of a measuring axis varies asymmetrically between a + side and a − side of the measuring angle with respect to the retardation value at 0°" refers to the state in which a graph made by, for example, plotting the retardation value at each measuring angle in a vertical axis and the measuring angles in a horizontal axis is asymmetrical with respect to the vertical axis (a dotted line in the figure) at the measuring angle of 0° (normal line) as shown in FIG. 1.

The measuring angle is not particularly limited but preferably is −50° to +50°, for example. This is because, when inclining a sample of the inclined optical compensation film and measuring the retardation in practice, the above-noted range allows still more accurate retardation measurement. It should be noted that this measuring angle is only a condition of measuring the retardation in the present invention and by no means limits the present invention.

In the present invention, it is preferable that the retardation value reaches its maximum value or minimum value on the + side or the − side of the measuring angle. In other words, it is preferable that the retardation value in the normal line (0°) direction is not the maximum value or the minimum value.

In the inclined optical compensation film of the present invention, the shape of the graph can be, for example, a substantially U-shaped curve as shown in FIG. 1, a substantially inverted-U-shaped curve, a curve slanting upward to the right or a curve slanting downward to the right. The vertex shows a minimum retardation value when the graph shape is a substantially U-shaped curve, while the vertex shows a maximum retardation value when the graph shape is a substantially inverted-U-shaped curve. In the case of a curve slanting upward to the right, the measurement value at a maximum measuring angle (for example, +50°) corresponds to a maximum retardation value and that at a minimum measuring angle (for example, −50°) corresponds to a minimum retardation value. In the case of a curve slanting downward to the right, the measurement value at a maximum measuring angle corresponds to a minimum retardation value and that at a minimum measuring angle corresponds to a maximum retardation value.

In the present invention, the measuring axis includes the normal line and an axis inclined from the normal line, and the direction of inclination is not particularly limited. For example, the axis inclined from the normal line may be inclined in a slow axis direction of the inclined optical compensation film or in a fast axis direction of the inclined optical compensation film.

In the present invention, it is preferable that the birefringence (Δn) represented by the equation above ranges from 0.001 to 0.5 because the reduction in thickness becomes duly possible. Also, the birefringence ranges preferably from 0.001 to 0.2 and particularly preferably from 0.002 to 0.15 since, for example, a thin inclined optical compensation film with a still better productivity can be achieved.

Although other optical characteristics are not particularly limited either, an in-plane retardation (Δnd) shown by the equation below ranges, for example, from 5 to 200 nm and preferably from 10 to 150 nm. Further, a retardation in a thickness direction (Rth) shown by the equation below ranges, for example, from 20 to 1000 nm, preferably from 30 to 800 nm and more preferably from 40 to 500 nm. In the equations below, nx, ny, nz and d are as described above.

$$\Delta nd = (nx - ny) \cdot d$$

$$Rth = [\{(nx+ny)/2\} - nz] \cdot d$$

It is preferable that the inclined optical compensation film of the present invention is applied to, for example, a liquid crystal display whose display system is a TN (Twisted Nematic) mode or an OCB (Optically Aligned Birefringence) mode as described above. Also, in the case of a liquid crystal display whose liquid crystal has a monodomain alignment, its display system is not limited but also can be applied to a VA mode liquid crystal display or the like, for example.

It is preferable that the inclined optical compensation film of the present invention is disposed in a liquid crystal display, whereby, for example, a region showing a contrast of at least 10 in the liquid crystal display whose display system is the TN mode is expanded to 10° or more in right and left directions of a display screen.

The above-mentioned contrast can be measured by, for example, a method described in the following. First, together with a polarizing plate, a sample is disposed in a liquid crystal display. The liquid crystal display is allowed to display a white image and a black image. Then, values of Y, x and y in an XYZ display system at viewing angles of 0° to 70° are measured respectively by, for example, trade name EZ Contrast 160D (manufactured by ELDIM SA.) for front, top, bottom, right and left parts of the display screen. From the value of Y in the white image ($Y_W$) and that in the black image ($Y_B$), the contrast at each viewing angle can be calculated.

Unlike a liquid crystal material, for example, the non-liquid crystal polymer in the present invention can form a film exhibiting an optically negative uniaxiality (nx>nz), (ny>nz) by its own property regardless of the alignment property of the base. Thus, without using a birefringent base such as an alignment substrate or a substrate having an alignment layer-laminated surface as in a conventional liquid crystal material, the non-liquid crystal polymer becomes aligned because of its own property. Accordingly, even though the non-liquid crystal polymer is not a liquid crystal material, it can be inclined and aligned by the treatment described below.

The above-noted non-liquid crystal polymer preferably is a polymer such as polyamide, polyimide, polyester, polyaryletherketone, polyetherketone, polyamide imide and polyesterimide, for example, because of its excellent heat resistance, chemical resistance, transparency and hardness. It may be possible to use one of these polymers alone or a mixture of two or more polymers having different functional groups, for example, a mixture of polyaryletherketone and polyamide. Among these polymers, polyimide is particularly preferable because a high birefringence can be obtained. Such a high birefringence brings about a large birefringent value, thereby producing a substantially the same level of compensating effect with a layer thinner than that in the case of using other polymers. These polymers are not particularly limited but can be, for example, polymers disclosed in U.S. Pat. No. 5,344,916, U.S. Pat. No. 5,395,918, U.S. Pat. No. 5,480,964, U.S. Pat. No. 5,580,950, U.S. Pat. No. 5,694,187, U.S. Pat. No. 5,750,641 and U.S. Pat. No. 6,074,709.

The molecular weight of the above-mentioned polymer is not particularly limited, but the weight-average molecular weight (Mw) thereof preferably ranges from 1,000 to 1,000,000 and more preferably ranges from 2,000 to 500,000.

As the polyimide, it is preferable to use a polyimide that has a high in-plane alignment and is soluble in an organic solvent. More specifically, it is possible to use a polymer containing a condensation polymer of 9,9-bis(aminoaryl) fluorene and an aromatic tetracarboxylic dianhydride disclosed in JP 2000-511296 A, for example, and at least one repeating unit represented by the formula (1) below.

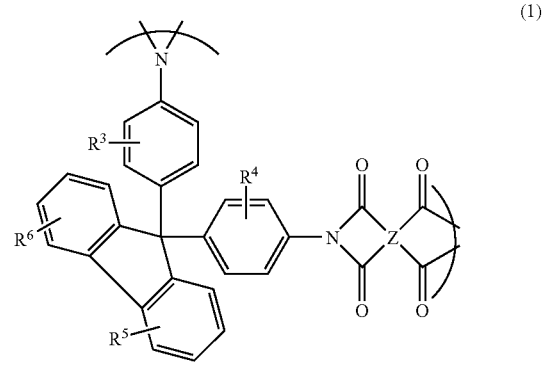

In the above formula (1), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group or a group represented by the formula (2) below.

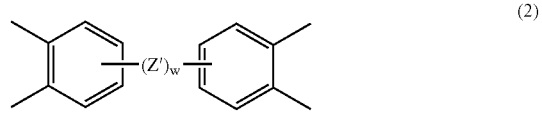

In the formula (2) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the formula (5) below is a preferable mode of the homopolymer represented by the formula (3).

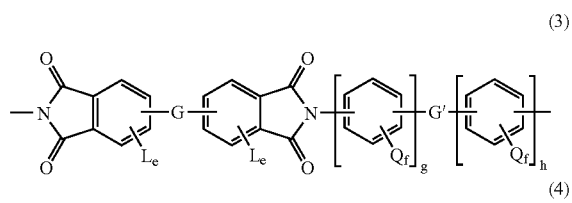

(3)

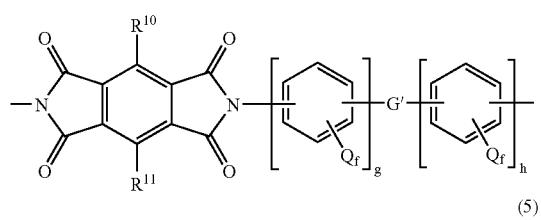

(4)

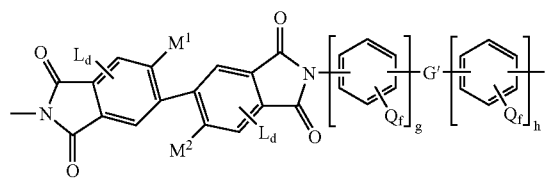

(5)

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (3) includes polyimide represented by the formula (6) below.

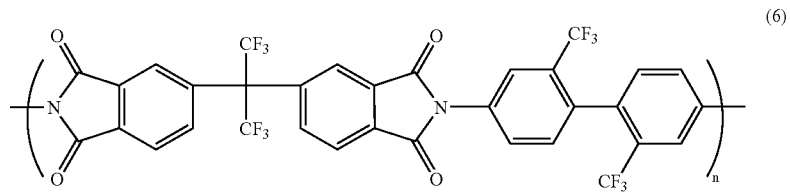

(6)

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalenetetracarboxylic dianhydride, 1,2,5,6-naphthalenetetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride (3,3',4,4'-diphenylsulfone tetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diamino diphenyl thioether or 4,4'-diaminodiphenylsulfone.

The above-mentioned polyetherketone may be, for example, polyaryletherketone represented by the general formula (7) below, which is disclosed in JP 2001-49110A.

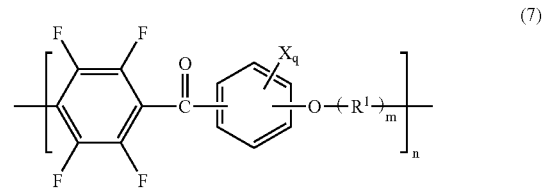

In the above formula (7), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight alkyl group or a $C_{1-6}$ lower branched alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

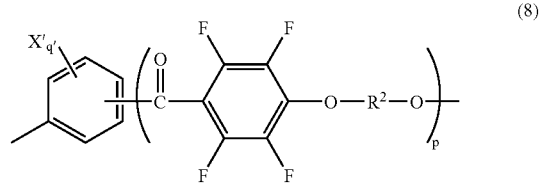

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the formulae (9) to (15) below.

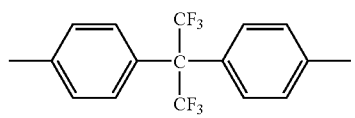

(9)

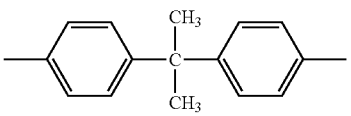

(10)

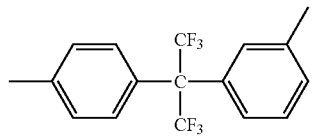

(11)

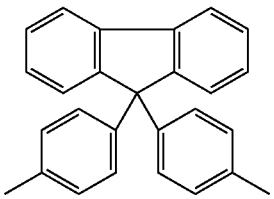

(12)

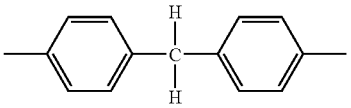

(13)

(14)

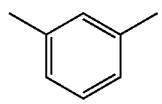

(15)

In the above formula (7), the $R^1$ preferably is a group represented by the formula (16) below, wherein $R^2$ and p are equivalent to those in the above-noted formula (8).

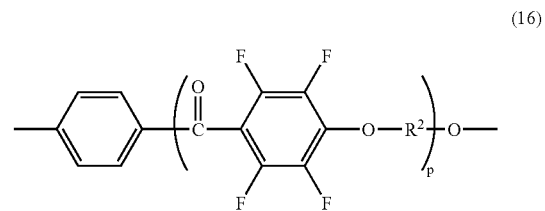

(16)

Furthermore, in the formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below. In the formula below, n indicates a degree of polymerization as in the formula (7).

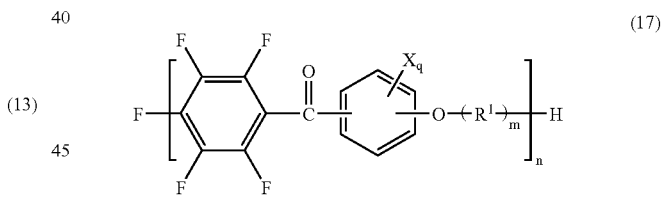

(17)

Specific examples of the polyaryletherketone represented by the formula (7) may include those represented by the formulae (18) to (21) below, wherein n indicates a degree of polymerization as in the formula (7).

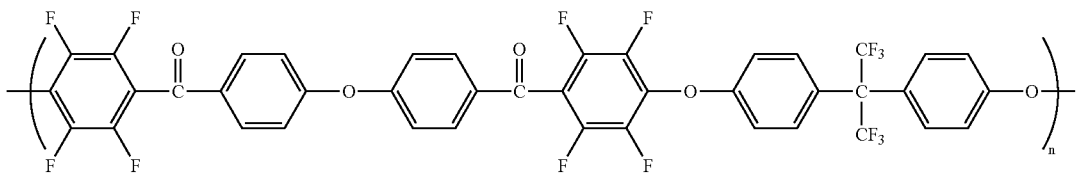

(18)

-continued

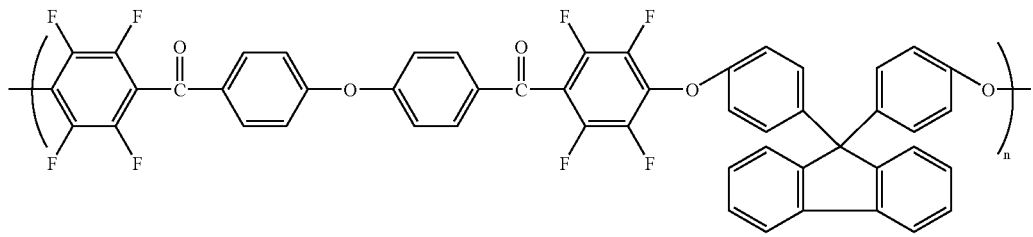

(19)

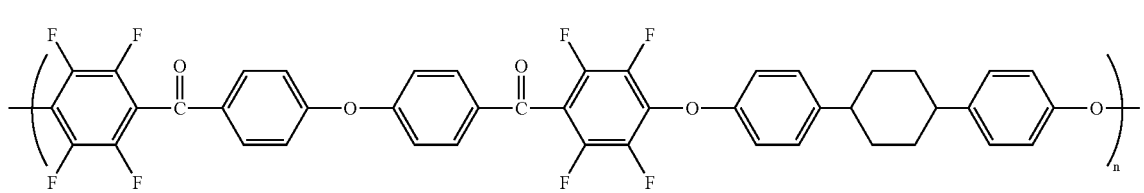

(20)

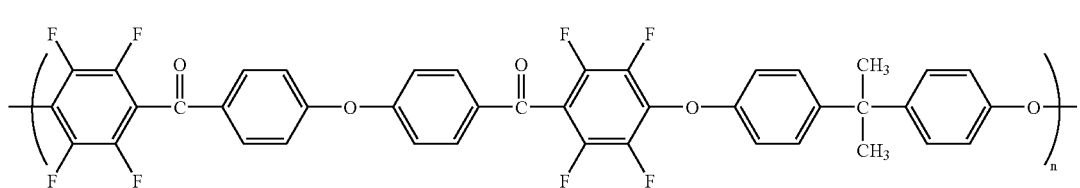

(21)

Other than the above, the polyamide or polyester may be, for example, polyamide or polyester described by JP 10(1998)-508048 A, and their repeating units can be represented by the general formula (22) below.

group, a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a

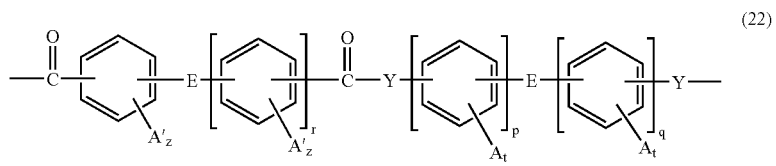

(22)

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein.

Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the formula (22) above, the repeating unit represented by the general formula (23) below is preferable.

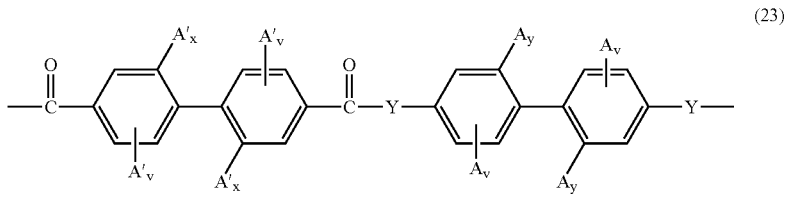

(23)

In the formula (23), A, A' and Y are those defined by the formula (22), and v is an integer from 0 to 3, preferably is an integer from 0 to 2. Although each of x and y is 0 or 1, not both of them are 0.

The inclined optical compensation film of the present invention may be, for example, a birefringent layer alone formed of the above-described incline-aligned non-liquid crystal polymer or a laminate of this birefringent layer and other members such as a base.

In the present invention, the thickness of the birefringent layer formed of the non-liquid crystal polymer is not particularly limited but preferably ranges from 0.1 to 50 μm, more preferably ranges from 0.5 to 30 μm and particularly preferably ranges from 1 to 20 μm because its use as a retardation film makes it possible to reduce the thickness of a liquid crystal display and form a uniform film with an excellent visually-compensating function. The thickness of the inclined optical compensation film of the present invention varies from the case of having the birefringent layer alone as described above to the case of including other members such as the base as well and, for example, ranges from 0.5 to 50 μm and preferably ranges from 1 to 40 μm.

The following is a description of a method for producing the inclined optical compensation film of the present invention. The producing method is not particularly limited as long as the inclined optical compensation film of the present invention satisfies the above-described condition but can be, for example, first and second producing methods described below.

The first producing method mentioned above includes coating a base with the above-noted non-liquid crystal polymer, thereby forming a coating film, and inclining and aligning the non-liquid crystal polymer in the coating film, thereby forming an inclined optical compensation film. The non-liquid crystal polymer is inclined and aligned by applying an external force to the coating film so that the non-liquid crystal polymer is inclined and aligned. The following is a specific description thereof First, a base is coated with the non-liquid crystal polymer, thus forming a coating film. As described earlier, because of an optical uniaxiality of the non-liquid crystal polymer, it is unnecessary to utilize an alignment property of the base. Therefore, the base can be either an alignment substrate or a non-alignment substrate. Furthermore, the base may or may not generate retardation owing to a birefringence. The base generating retardation owing to a birefringence can be, for example, a stretched film. A film whose refractive index in a thickness direction is controlled also can be used. The refractive index can be controlled by allowing the polymer film to adhere to a thermally shrinkable film and further stretching them while heating.

The material for the base is not particularly limited but preferably is a polymer having an excellent transparency. It preferably is a thermoplastic resin because it is suitable for a stretching treatment and a shrinking treatment as described later. More specifically, examples thereof include acetate resins such as triacetylcellulose (TAC), polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinyl alcohol resins, polyvinyl chloride resins, polyvinylidene chloride resins, polyacrylic resins and a mixture thereof. Also, a liquid crystal polymer can be used. Moreover, as described in JP 2001-343529 A (WO 01/37007), a mixture of a thermoplastic resin whose side chain has a substituted or unsubtituted imido group and a thermoplastic resin whose side chain has a substituted or unsubtituted phenyl group and nitrile group also can be used. More specific example can be a resin composition containing an alternating copolymer of isobutene and N-methylene maleimide and an acrylonitrile-styrene copolymer. Among these forming materials, the above-mentioned mixture of a thermoplastic resin whose side chain has a substituted or unsubtituted imido group and a thermoplastic resin whose side chain has a substituted or unsubtituted phenyl group and nitrile group is preferable.

The thickness of the base is not particularly limited but ranges, for example, from 5 to 500 μm, preferably from 10 to 200 μm and particularly preferably from 15 to 150 μm.

Although there is no particular limitation on the method for coating the base with the non-liquid crystal polymer, a method of, for example, coating the base with a polymer solution prepared by dissolving the non-liquid crystal polymer in a solvent is preferable because of its excellent workability.

Although there is no particular limitation on a polymer concentration of the polymer solution, for example, 5 to 50 parts by weight of the non-liquid crystal polymer is preferable and 10 to 40 parts by weight of the polymer is more preferable with respect to 100 parts by weight of the solvent because a viscosity allowing an easy coating can be obtained.

The solvent of the polymer solution is not particularly limited as long as it can dissolve the non-liquid crystal polymer, and can be determined suitably according to a kind of the non-liquid crystal polymer. Specific examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. These solvents may be used alone or in combination of two or more.

In the polymer solution, various additives such as a stabilizer, a plasticizer, metal and the like further may be blended as necessary. More specifically, these additives can be a silane coupler or an acrylic copolymer for improving adherence to the base and other members.

Moreover, the polymer solution may contain other resins as long as the alignment of the non-liquid crystal polymer does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the above-described other resins are blended in the polymer solution as mentioned above, the blend amount ranges, for example, from 0 wt % to 50 wt %, preferably from 0 wt % to 30 wt %, with respect to the polymer material.

The coating method of the above-mentioned polymer solution can be, for example, spin coating, roller coating, flow coating, printing, dip coating, film flow-expanding, bar coating or gravure printing. Also, at the time of coating, a laminating method of polymer layers also can be adopted, as necessary.

Next, by applying an external force to the coating film on the base, the non-liquid crystal polymer is inclined and aligned. The inclination and alignment in this manner forms the inclined optical compensation film on the base. The method for applying an external force is not particularly limited as long as it inclines and aligns the non-liquid crystal polymer. For example, a method of blowing air onto the coating film can be adopted.

The condition of blowing air onto the coating film is not particularly limited but can be determined suitably according to the physical properties such as viscosity of the above-noted polymer solution. For example, when the coating film is fixed, the air is blown at an angle of preferably 10° to 80° and more preferably 20° to 70° with respect to the normal line of the surface of the coating film.

Moreover, the duration of blowing air is not particularly limited but can be determined suitably according to a desired angle of inclination of the non-liquid crystal polymer. For example, the blowing duration preferably is 5 seconds to 10 minutes, more preferably is 10 seconds to 9 minutes and particularly preferably is 30 seconds to 8 minutes for each position.

By applying an external force to the coating film as described above, it is possible to incline and align the non-liquid crystal polymer for forming the coating film at 5° to 50° from the normal direction of the coating film. This angle of inclination/alignment can be determined suitably according to the intended use, for example.

The inclination angle of the non-liquid crystal polymer can be calculated as an average inclination angle from the normal direction by using, for example, a retardation meter (trade name KOBRA-21ADH; Oji Scientific Instruments) or the like.

After applying the external force to the coating film, it may be possible to perform a process of solidifying the inclined and aligned non-liquid crystal polymer on the base. There is no particular limitation on the method for solidifying the non-liquid crystal polymer. For example, the inclined and aligned non-liquid crystal polymer can be allowed to air-dry or subjected to heat treatment, thereby solidifying the non-liquid crystal polymer on the base.

As the condition of the heat treatment, the heating temperature ranges preferably from 25° C. to 300° C., more preferably from 50° C. to 250° C. and particularly preferably from 60° C. to 200° C., for example.

The solvent in the polymer solution remaining in the inclined optical compensation film on the base may vary the film's optical characteristics over time in proportion to the amount of the solvent. Therefore, the remaining amount should be controlled by the above-noted heat treatment or the like to preferably 5% or lower, more preferably 2% or lower and further preferably 0.2% or lower.

Furthermore, in the inclining and aligning process, it may be possible to blow a hot air, for example, thereby carrying out the inclining and aligning process and the solidifying process at the same time. In other words, by carrying out both of these processes at the same time, the non-liquid crystal polymer may be inclined/aligned and solidified.

The inclined optical compensation film formed in the manner described above may be subjected to, for example, a dry process such as a corona treatment and an ozone treatment or a wet process such as an alkali treatment in order to improve adherence to other members.

On the other hand, the second producing method mentioned above includes coating a base with the above-noted non-liquid crystal polymer, thereby forming a coating film, and inclining and aligning the non-liquid crystal polymer in the coating film. The non-liquid crystal polymer is inclined and aligned as follows. A shrinkable base (a first base) is used as the base, and after forming the coating film on the first base, a second base having a shrinkage ratio different from the first base is further formed on the coating film so as to sandwich the coating film between the first and second bases, so that the external force is applied to the coating film by allowing the first and second bases to shrink together. The following is a specific description thereof. It should be noted that an inclined optical compensation film can be produced similarly using a material similar to that in the above-described first producing method unless otherwise specified.

Prior to forming the coating film, the shrinkable first and second bases are prepared. These bases can be made of materials similar to the above as long as they are shrinkable and have different shrinkage ratios from each other. Incidentally, the second base is appropriate as long as it has a shrinkage ratio different from the first base, and may be unshrinkable, for example.

It is preferable that the shrinkable base is shrinkable in one direction within the plane. Such shrinkability can be provided by subjecting an untreated base to a stretching treatment, for example. The base is pre-stretched in this manner, so that the base becomes shrinkable in a direction opposite to the stretched direction. Further, if the base is inherently shrinkable, it may be used without being treated and allowed to shrink by heating.

The thickness of the base before being stretched is not particularly limited but can range, for example, from 10 to 200 μm, preferably from 20 to 150 μm and particularly preferably from 30 to 100 μm.

There is no particular limitation on the method for stretching the base. For example, since the base can be allowed to shrink in one direction later on, it is preferable that the base is stretched while one end thereof is fixed (a fixed-end stretching). As described above, when a base is stretched, the direction opposite to the stretched direction becomes a shrinking direction. Therefore, stretching the base in one direction while fixing one end of the base causes the shrinkage in one direction. In this manner, the non-liquid crystal polymer on the base can be inclined and aligned in one direction as described later.

Subsequently, the first base is coated with a non-liquid crystal polymer as described earlier, thus forming a coating film. Further, this coating film is laminated with the second base so that the coating film is sandwiched between the first and second bases. At this time, it is preferable to align the stretched directions of the first base and the second base, namely, the shrinking directions of the first base and the second base.

The method for laminating the coating film with the second base is not particularly limited. For example, it may be laminated directly. In this case, the second base may be removed after inclining and aligning the non-liquid crystal polymer or may be used as one piece therewith if the adherence is sufficiently high. Also, there is no limitation to the above, and the second base may be made to adhere onto the coating film with an adhesive or a pressure sensitive adhesive.

Thereafter, the external force is applied to the coating film by the difference in shrinkage ratio between the first and second bases. It should be noted that one of these bases may be unshrinkable.

When these bases are (or one of these bases is) allowed to shrink as above, the difference in their shrinkage ratios causes the difference in the degree of shrinkage between them, which inclines and aligns the non-liquid crystal polymer forming the coating film. More specifically, in the case where the first base has a larger shrinkage ratio than the second base, for example, a portion in the coating film on the side of the first base shrinks more than a portion on the side of the second base owing to this difference in shrinkage ratios, so that the non-liquid crystal polymer forming the coating film is inclined and aligned. Accordingly, as the difference in shrinkage ratios between both the bases becomes larger, the angle of inclination of the polymer increases, for example. More specifically, in the case where the normal line of the inclined optical compensation film is set at 0°, the angle of inclination of the non-liquid crystal polymer with respect to the normal line increases, so that the polymer is inclined toward the surface of the base.

Since the non-liquid crystal polymer on the base preferably is inclined and aligned in a certain direction as described above, it is preferable in the case of allowing both the bases to shrink that one end of the first base and one end of the second base in the shrinking direction are both fixed, for example.

As the method for allowing the bases to shrink, a heat treatment can be used, for example. The condition of the heat treatment is not particularly limited but can be determined suitably according to, for example, the kinds of the non-liquid crystal polymer and the kinds of materials for the bases. The heating temperature can range, for example, from 25° C. to 300° C., preferably from 50° C. to 200° C. and particularly preferably from 60° C. to 180° C.

In this manner, the inclined optical compensation film formed of the non-liquid crystal polymer that is inclined and aligned is formed on the first base. Incidentally, when using the inclined optical compensation film, one of the first and second bases may be peeled off or both of the bases remain laminated, for example.

Also, similarly to the first producing method, after the non-liquid crystal polymer is inclined and aligned, it may be possible to perform a process of solidifying the inclined and aligned non-liquid crystal polymer on the first base or to carry out the above-mentioned heat treatment, thereby both inclining/aligning and solidifying the polymer.

The inventors of the present invention found out for the first time that the inclined optical compensation film according to the present invention can be produced by the above-described method. However, the method for producing the inclined optical compensation film of the present invention is not limited to this method.

The inclined optical compensation film formed on the base may be peeled off from the base or used as a laminate of the film and base.

The inclined optical compensation film produced as above according to the present invention has a birefringence ($\Delta n$) ranging from 0.001 to 0.5 as described earlier. As for other optical characteristics, the retardation in the thickness direction (Rth) ranges preferably from 20 to 1000 nm and more preferably from 30 to 800 nm. The in-plane retardation ($\Delta nd$) ranges preferably from 0 to 100 nm and more preferably from 10 to 70 nm.

Furthermore, the method for producing an inclined optical compensation film according to the present invention may further include a stretching process or a shrinking process. When the inclined optical compensation film is formed using a liquid crystal material as in the conventional case, the liquid crystal material is solidified after being inclined and aligned. Therefore, it is not possible to subject the formed inclined optical compensation film to a further treatment such as stretching. For example, if subjected to a stretching treatment, the inclined and aligned molecular structure falls apart, losing the optical characteristics as the inclined optical compensation film. Thus, after the liquid crystal material is inclined and aligned, its optical characteristics cannot be varied any longer. However, when a non-liquid crystal polymer is used as the forming material as in the producing method of the present invention, it can be stretched further even after being solidified. Accordingly, it is possible to vary the in-plane retardation and the retardation in the thickness direction, so that the optical characteristics can be set according to an intended use, for example. When it becomes possible to vary the optical characteristics further in this way, a resultant inclined optical compensation film achieves a wider range of applications, which may lead to a cost reduction.

More specifically, the optical characteristics can be further varied by, for example, stretching both the base and the inclined optical compensation film formed on the base further. By stretching the inclined optical compensation film in this manner, it becomes possible to vary the in-plane retardation and the retardation in the thickness direction in the inclined optical compensation film. It should be noted however that the above-noted stretching treatment is not limited to these methods. For example, the base alone can be stretched because the inclined optical compensation film also is stretched with the base. Alternatively, the base is peeled off, and then the inclined optical compensation film alone can be stretched.

Furthermore, other than the stretching method described above, it also may be possible to use a shrinkable base as the base, form the inclined optical compensation film on the base and then allow the base to shrink. By allowing the base to shrink after forming the inclined optical compensation film as mentioned above, the inclined optical compensation film also shrinks, so that the in-plane retardation can be varied further.

In this manner, the stretching or shrinking treatment is performed after inclining and aligning the non-liquid crystal polymer, thereby varying the optical characteristics of the inclined optical compensation film such that the retardation in the thickness direction (Rth) ranges from 20 to 1000 nm and the in-plane retardation (Δnd) ranges from 5 to 200 nm, for example. It should be noted that the degree of stretching or shrinkage may be changed according to desired optical characteristics, for example, and can be changed by a known method.

Figures 2A, 2B, 2C, 2D:
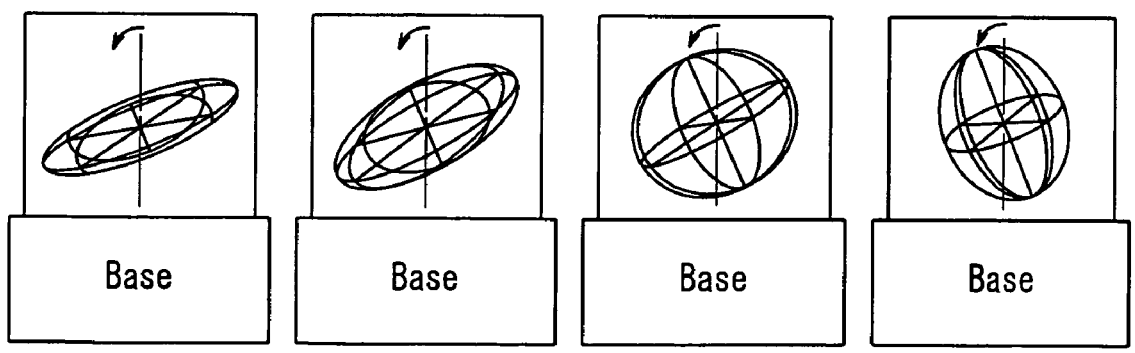
FIGS. 2A to 2D are schematic views showing an index ellipsoid in the inclined optical compensation film according to the present invention.

As described above, in the inclined optical compensation film according to the present invention, the anisotropy of an optical refractive index also can be controlled in a various manner. Thus, an index ellipsoid of the inclined optical compensation film according to the present invention may be forms shown in FIG. 2 or be hybrid-aligned forms thereof FIGS. 2A to 2D schematically illustrate index ellipsoids of the incline-aligned compensation film of the present invention, with FIG. 2A showing that the index ellipsoid of nx≈ny>nz is inclined, FIG. 2B showing that the index ellipsoid of nx>ny>nz is inclined, FIG. 2C showing that the index ellipsoids of nx>nz>ny and nz>nx>ny are inclined, and FIG. 2D showing that the index ellipsoid of nz>nx≈ny is inclined. Incidentally, in FIGS. 2A to 2D, the axis passing through the center of the ellipse corresponds to "the normal line of the inclined optical compensation film", and "the normal line of the index ellipsoid" is inclined toward the direction indicated by an arrow.

Now, the inclined optical compensation film of the present invention is useful as a retardation film and a retardation plate for optical compensation, for example.

As long as the inclined optical compensation film according to the present invention includes a birefringent layer in which the non-liquid crystal polymer is inclined and aligned as described above, there is no particular limitation on other structures. For example, the following modes can be illustrated. When the inclined optical compensation film of the present invention is formed on the above-mentioned base (the first base), for example, it may be the inclined birefringent layer alone peeled off from the first base or a laminate of the first base and the birefringent layer formed directly on the first base. It also may be a laminate obtained by peeling off the birefringent layer from the first base and then laying it onto the other second base or a laminate obtained by making a laminate of the first base and the birefringent layer adhere to the second base so that the birefringent layer faces the second base and then peeling off only the first base.

Among these modes, the laminate of the first base and the birefringent layer is preferable because it can be used as it is after forming the birefringent layer directly on the base, simplifying the producing processes, so that an inexpensive inclined optical compensation film to be used in various image display apparatuses, for example, liquid crystal displays can be provided.

Further, a polarizing plate of the present invention includes an optical compensation film and a polarizer, and the optical compensation film is the inclined optical compensation film according to the present invention.

The structure of such a laminated polarizing plate is not particularly limited as long as it has the above-described inclined optical compensation film of the present invention and the polarizer. For example, the following structure can be illustrated.

For instance, a first laminated polarizing plate has the above-described inclined optical compensation film of the present invention, a polarizer and two transparent protective layers. The transparent protective layers respectively are laid on both surfaces of the polarizer. The surface of one of the transparent protective layers is laminated further with the inclined optical compensation film. In the case where the inclined optical compensation film is a laminate of the birefringent layer and a resin base as described earlier, one of its surfaces may face the transparent protective layer.

The transparent protective layers may be laid on both surfaces of the polarizer or only on one surface thereof Further, when they are laid on both surfaces, the kinds of the transparent protective layers may be the same or different.

On the other hand, the second laminated polarizing plate has the above-described inclined optical compensation film of the present invention, a polarizer 2 and a transparent protective layer. The inclined optical compensation film is provided on one surface of the polarizer, while the transparent protective layer is provided on the other surface of the polarizer 2.

In the case where the inclined optical compensation film is a laminate of the birefringent layer and a resin base as described earlier, one of its surfaces may face the polarizer. However, the base side of the inclined optical compensation film preferably is arranged so as to face the polarizer for the following reason. With the above structure, the base of the inclined optical compensation film can be used also as the transparent protective layer in the laminated polarizing plate. In other words, instead of laminating both surfaces of the polarizer with transparent protective layers, one surface of the polarizer is laminated with the transparent protective layer and the other surface thereof is laminated with the inclined optical compensation film such that the base faces this surface. Accordingly, the base also serves as the transparent protective layer. Consequently, it is possible to obtain a still thinner polarizing plate.

In the case where the inclined optical compensation film is a laminate of the above-described birefringent layer and a resin base, the polarizer also can be used as the resin base. The resin base also serves as the polarizer, thereby achieving a still thinner polarizing plate.

The polarizer (a polarizing film) is not particularly limited but can be a film prepared by, for example, allowing various films to adsorb a dichroic material such as iodine or a dichroic dye and dyeing them, followed by cross-linking, stretching and drying by a conventionally known method. Especially, films transmitting linearly polarized light when natural light is allowed to enter are preferable, and films having excellent light transmittance and polarization degree are preferable. Examples of the various films in which the dichroic material is to be adsorbed include hydrophilic polymer films such as polyvinyl alcohol (PVA)-based films, partially-formalized PVA-based films, partially-saponified films based on ethylene-vinyl acetate copolymer and cellulose-based films. Other than the above, polyene aligned films such as dehydrated PVA and dehydrochlorinated polyvinyl chloride can be used, for example. Among them, the PVA-based film is preferable. In addition, the thickness of the polarizing film generally ranges from 1 to 80 µm, though it is not limited to this.

The protective layer is not particularly limited but can be a conventionally known transparent protective film. For example, transparent protective films having excellent transparency, mechanical strength, thermal stability, moisture shielding property and isotropism are preferable. Specific examples of materials for such a transparent protective layer can include cellulose-based resins such as triacetylcellulose (TAC), and transparent resins based on polyester, polycarbonate, polyamide, polyimide, polyethersulfone, polysulfone, polystyrene, polynorbornene, polyolefin, polyacrylic substances, polyacetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Another example of the polymer film is described in JP 2001-343529 A (WO 01/37007). The polymer material used can be a resin composition containing a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methylene maleimide and an acrylonitrile-styrene copolymer. Alternatively, the polymer film may be formed by extruding the resin composition.

It is preferable that the protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the protective film, can be solved sufficiently. In the equation below, nx, ny and nz are equivalent to those described above, and d indicates the thickness of this film.

$$Rth=[\{(nx+ny)/2\}-nz]\cdot d$$

The transparent protective layer further may have an optically compensating function. As such a transparent protective layer having the optically compensating function, it is possible to use, for example, a known layer used for preventing coloring caused by changes in a visible angle based on retardation in a liquid crystal cell or for widening a preferable viewing angle. Specific examples include various stretched films obtained by stretching the above-described transparent resins uniaxially or biaxially, an aligned film of a liquid crystal polymer or the like, and a laminate obtained by providing an aligned layer of a liquid crystal polymer on a transparent base. Among the above, the aligned film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-aligned layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the retardation film and a film support of triacetylcellulose film or the like so as to control the optical characteristics such as retardation.

The thickness of the transparent protective layer is not particularly limited but can be determined suitably according to retardation or a protection strength. In general, the thickness is not greater than 500 µm, preferably ranges from 5 to 300 µm, and more preferably ranges from 5 to 150 µm.

The transparent protective layer can be formed suitably by a conventionally known method such as a method of coating a polarizing film with the above-mentioned various transparent resins or a method of laminating the polarizing film with the transparent resin film, the optically compensating retardation plate or the like, or can be a commercially available product.

The above-described transparent protective layer may be further subjected to, for example, a hard coating treatment, an antireflection treatment, treatments for anti-sticking, diffusion and anti-glaring and the like. The hard coating treatment aims to prevent scratches on the surfaces of the polarizing plate, and is a treatment of, for example, providing a hardened coating film that is formed of a curable resin and has excellent hardness and smoothness onto a surface of the transparent protective film. The curable resin can be, for example, ultraviolet-curing resins of silicone base, urethane base, acrylic, and epoxy base. The treatment can be carried out by a conventionally known method. The anti-sticking treatment aims to prevent adjacent layers from sticking to each other. The antireflection treatment aims to prevent reflection of external light on the surface of the polarizing plate, and can be carried out by forming a known antireflection film or the like.

The anti-glare treatment aims to prevent reflection of external light on the polarizing plate surface from hindering visibility of light transmitted through the polarizing plate. The anti-glare treatment can be carried out, for example, by providing microscopic asperities on a surface of a transparent protective film by a known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 µm, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as a sheet of optical layers comprising these layers, separately from the transparent protective layer.

The method for laminating the above constituent members (the inclined optical compensation film, the polarizer and the transparent protective layer etc.) is not particularly limited but can be a conventionally known method. In general, a pressure sensitive adhesive, an adhesive or the like similar to the above can be used. The kind thereof can be determined suitably depending on materials of the constituent members. The adhesive can be, for example, a polymer adhesive based on acrylic substances, vinyl alcohol, silicone, polyester, polyurethane or polyether, or a rubber-based adhesive. The pressure sensitive adhesive and the adhesive mentioned above do not peel off easily even when being exposed to moisture or heat, for example, and have excellent light transmittance and polarization degree. More specifically, these pressure sensitive adhesive and adhesive preferably are PVA-based adhesives when the polarizer is a PVA-based film, in light of stability of adhering treatment. These adhesive and pressure sensitive adhesive may be applied directly to surfaces of the polarizer and the transparent protective layer, or a layer of a tape or a sheet formed of the adhesive or pressure sensitive adhesive may be arranged on the surfaces thereof. Further, when these adhesive and pressure sensitive adhesive are prepared as an aqueous solution, for example, other additives or a catalyst such as an acid catalyst may be blended as necessary. In the case of applying the adhesive, other additives or a catalyst such as an acid catalyst further may be blended in the aqueous solution of the adhesive. The thickness of the adhesive layer is not particularly limited but may be, for example, 1 to 500 nm, preferably 10 to 300 nm, and more preferably 20 to 100 nm. It is possible to adopt a conventionally known method of using an adhesive etc. such as an acrylic polymer or a vinyl alcohol-based polymer without any particular limitations. These adhesives can be used, for example, by applying its aqueous solution to the surface of each constituent member mentioned above, followed by drying. In the above aqueous solution, other additives or a catalyst such as an acid catalyst may be blended as necessary. Among these, the adhesive preferably is a PVA-based adhesive because an excellent adhesiveness to a PVA film can be achieved.

Moreover, the polarizing plate of the present invention also can be produced by the following methods. For example, in the case where the laminate is prepared by forming the birefringent layer on the base by the method for producing an inclined optical compensation film according to the present invention, it is possible to adopt a method of attaching the laminate to the polarizer or the transparent protective layer of the polarizing plate via the adhesive layer or the like so that the birefringent layer of the laminate faces the polarizer or the transparent protective layer of the polarizing plate. Alternatively, it may be possible to employ a method of attaching and transferring the birefringent layer of the laminate to the polarizer or the transparent protective layer and then peeling off only the first base. Further, it also may be possible to employ a method of forming the birefringent layer on one surface of the base (the first base) by the method for producing an inclined optical compensation film according to the present invention, and using this first base as the transparent protective layer of the polarizing plate so as to attach the polarizer to the other surface of the first base via the adhesive or the like. When the polarizing plate of the present invention is produced utilizing the method for producing an inclined optical compensation film according to the present invention as described above, a polarizing plate can be provided, for example, with a small number of processes at a low cost. Moreover, the birefringent layer is made thinner, it becomes possible to reduce the thickness of the polarizing plate itself including the birefringent layer.

Furthermore, the inclined optical compensation film according to the present invention also can be used in combination with conventionally known optical members such as retardation plates, diffusion control films and brightness enhancement films of various types other than the above-described polarizer. Examples of the above-mentioned retardation plates include a film obtained by stretching a polymer film uniaxially or biaxially, a film treated with a Z-axis alignment and a coating film of a liquid crystal polymer. The above-mentioned diffusion control films can be, for example, films utilizing diffusion, scattering and refraction and used for controlling a viewing angle, controlling glare or scattering light associated with resolution. The above-mentioned brightness enhancement films can be, for example, brightness enhancement films using a selective reflection of a cholesteric liquid crystal and a quarter wavelength plate (a λ/4 plate) or scattering films utilizing an anisotropic scattering owing to a polarization direction. The inclined optical compensation films also can be combined with a wire grid polarizer.

At the time of an actual use, the laminated polarizing plate of the present invention may include other optical layers in addition to the inclined optical compensation film of the present invention. Examples of such optical layers include various conventionally known optical layers used for forming a liquid crystal display, for example, a polarizing plate, a reflection plate, a semi-transmission reflection plate and a brightness enhancement film as described below. These optical layers may be of one kind or two or more kinds. Also, one layer or two or more layers of these optical layers may be provided. The laminated polarizing plate further including such an optical layer preferably is used as, for example, an integral polarizing plate having an optical compensating function and is used suitably in various image display apparatuses, for example, placed on the surface of a liquid crystal cell.

The above-noted integral polarizing plates will be described below.

First, an example of the reflective polarizing plate or the semi-transmission reflective polarizing plate will be described. The reflection plate is provided further to a laminated polarizing plate of the present invention in order to form the reflective polarizing plate, and the semi-transmission reflection plate is provided further to a laminated polarizing plate of the present invention in order to form the semi-transmission reflective polarizing plate.

In general, such a reflective polarizing plate is arranged on a backside of a liquid crystal cell in order to make a liquid crystal display (a reflective liquid crystal display) to reflect incident light from a visible side (display side). The reflective polarizing plate has some merits, for example, assembling of light sources such as backlight can be omitted, and the liquid crystal display can be made thinner.

The reflective polarizing plate can be formed in any conventionally known manner such as forming a reflection plate of metal or the like on one surface of the polarizing plate including the birefringent layer. For example, a transparent protective layer of the polarizing plate is prepared by matting one surface (exposed surface) if required. On this surface, a foil comprising a reflective metal such as aluminum or a deposition film is applied to form a reflective polarizing plate.

An additional example of a reflective polarizing plate comprises the above-mentioned transparent protective layer having a surface of a microscopic asperity due to fine particles contained in various transparent resins, and also a reflection plate corresponding to the microscopic asperity. The reflection plate having a microscopic asperity surface diffuses incident light by irregular reflection so that directivity and glare can be prevented and irregularity in color tones can be controlled. This reflection plate can be formed by disposing a metal foil or a metal deposition film directly on a microscopic asperity surface of the transparent protective layer in any conventionally known methods including deposition such as vacuum deposition, and plating such as ion plating and sputtering.

Alternatively, as the reflection plate, it may be possible to use a reflecting sheet formed by providing a reflecting layer onto a proper film similar to the transparent protective film. Since the reflecting layer of the reflection plate typically is made of a metal, it is preferable in use of the reflection plate that the reflecting surface of the reflecting layer is coated with a film, a polarizing plate or the like in order to prevent the reflection rate from lowering due to oxidation. As a result, the initial reflection rate is maintained for a long period, and a separate transparent protective layer can be omitted.

On the other hand, the semi-transmission polarizing plate is provided by replacing the reflection plate in the above-mentioned reflective polarizing plate by a semi-transmission reflection plate, and it is exemplified by a half mirror that reflects and transmits light at the reflecting layer.

In general, such a semi-transmission polarizing plate is arranged on a backside of a liquid crystal cell. In a liquid crystal display comprising the semi-transmission polarizing plate, incident light from the visible side (display side) is reflected to display an image when the liquid crystal display is used in a relatively bright atmosphere, while in a relatively dark atmosphere, an image is displayed by using a built-in light source such as a backlight in the backside of the semi-transmission polarizing plate. In other words, the semi-transmission polarizing plate can be used to form a liquid crystal display that can save energy for a light source such as a backlight under a bright atmosphere, while a built-in light source can be used under a relatively dark atmosphere.

Now, an example of a polarizing plate obtained by further laminating a brightness enhancement film on the laminated polarizing plate of the present invention will be described.

The brightness enhancement film is not particularly limited but can be a film having a property of transmitting linearly polarized light with a predetermined polarization axis and reflecting other light, for example, a dielectric multilayer thin film or a multilayer laminate of thin films with different refractive index anisotropies. Such a brightness enhancement film is, for example, trade name "D-BEF" manufactured by 3M Corporation. It also is possible to use a cholesteric liquid crystal layer, especially an aligned film of a cholesteric liquid crystal polymer, and this aligned liquid crystal layer supported on a film base. These films exhibit a property of reflecting one of right and left circularly polarized lights and transmitting the other light and are, for example, trade name "PCF350" manufactured by Nitto Denko Corporation or trade name "Transmax" manufactured by Merck Ltd.

The polarizing plates of various kinds according to the present invention may be an optical member including two or more optical layers obtained by, for example, layering a further optical layer in addition to the above-described laminated polarizing plate including the birefringent layer.

Such an optical member including two or more laminated optical layers of course can be formed by laminating each layer sequentially in each producing process of a liquid crystal display, for example. However, the use of an optical member that has been laminated in advance has an advantage in that excellent quality stability and assembling operability are achieved, leading to an improvement in the efficiency in producing a liquid crystal display. Incidentally, similarly to the above, various adhesive means such as a pressure sensitive adhesive layer can be used for the lamination.

Moreover, it is preferable that the above-described various polarizing plates further have a pressure sensitive adhesive layer or an adhesive layer, which allows easier lamination onto the other members such as a liquid crystal cell. These adhesive layers can be arranged on one surface or both surfaces of the polarizing plate. The material for the pressure sensitive adhesive layer is not particularly limited but can be a conventionally known material such as acrylic polymers. Further, the pressure sensitive adhesive layer having a low moisture absorption coefficient and an excellent heat resistance is preferable from the aspects of prevention of foaming or peeling caused by moisture absorption, prevention of degradation in the optical properties and warping of a liquid crystal cell caused by difference in thermal expansion coefficients and formation of a liquid crystal display with high quality and excellent durability. It also may be possible to incorporate fine particles so as to form the pressure sensitive adhesive layer showing light diffusion property. The pressure sensitive adhesive layer can be formed on the surface of the polarizing plate by, for example, applying a solution or a melt of various pressure sensitive adhesive materials directly to a predetermined surface of the polarizing plate by an expansion method such as flow-expansion or coating, or forming a pressure sensitive adhesive layer on a separator, which will be described later, in the same manner and transferring it to a predetermined surface of the polarizing plate. Such a layer can be formed on either surface of the polarizing plate. For example, it can be formed on an exposed surface of the retardation plate of the polarizing plate.

In the case where the surface of the pressure sensitive adhesive layer provided to the polarizing plate is exposed, it is preferable to cover the surface with a liner (a separator) for the purpose of preventing the pressure sensitive adhesive layer from being contaminated until it is put to use. This liner can be formed by, for example, providing a suitable film such as the above-mentioned transparent protective film with a release coat such as a silicone-based release agent, a long-chain alkyl-based release agent, a fluorocarbon release agent or molybdenum sulfide, as necessary.

The pressure sensitive adhesive layer can be a monolayer or a laminate, for example. The laminate can be, for example, a combination of monolayers having different compositions or kinds. Further, when arranged on both surfaces of the polarizing plate, these pressure sensitive adhesive layers may be the same or different in composition or kind.

The thickness of the pressure sensitive adhesive layer can be determined suitably, for example, according to the structure of the polarizing plate and generally ranges from 1 to 500 μm.

It is preferable that the pressure sensitive adhesive layer is formed of a pressure sensitive adhesive exhibiting an excellent optical transparency, a moderate wettability and pressure sensitive adhesive properties such as cohesiveness and adhesiveness. Specific examples thereof include pressure sensitive adhesives prepared based on suitable polymers such as an acrylic polymer, a silicone-based polymer, polyester, polyurethane, polyether and synthetic rubber.

The adhesive properties of the pressure sensitive adhesive layer can be controlled suitably by a conventionally known method. For example, the degree of cross-linkage and the molecular weight are adjusted on the basis of a composition or molecular weight of the base polymer for forming the pressure sensitive adhesive layer, cross-linking method, a ratio of the contained cross-linkable functional group, and a ratio of the blended cross-linking agent.

The individual layers such as a polarizing film, a transparent protective layer, an optical layer and a pressure sensitive adhesive layer constituting the inclined optical compensation film, the polarizing plate and various optical members (various polarizing plate obtained by laminating further optical layers) according to the present invention as described above may be treated suitably with an UV absorber such as salicylate ester compounds, benzophenone compounds, benzotriazole compounds, cyanoacrylate compounds or nickel complex salt-based compounds, thus providing an UV absorbing capability.

The inclined optical compensation film and the polarizing plate according to the present invention can be used preferably for forming various devices such as liquid crystal displays as described above. For example, the polarizing plate is arranged on one side or both sides of a liquid crystal cell in order to form a liquid crystal panel used in a reflection-type, semi-transmission type or transmission and reflection type liquid crystal display.

The liquid crystal cell to form the liquid crystal display can be various cells such as an active-matrix driving type represented by a thin-film transistor (TFT) type, or a simple-matrix driving type represented by a TN (twist nematic) type or a STN (super twist nematic) type. Among the above, the present invention preferably is used in the liquid crystal cell whose display system is a TN type, an STN type or an OCB (Optically Aligned Birefringence) type. Even in the case of a VA (Vertically aligned) type liquid crystal cell, the present invention also can be applied as long as the liquid crystal has a monodomain alignment.

The liquid crystal cell typically has a structure in which liquid crystal is injected into a space between opposing liquid crystal cell substrates. The liquid crystal cell substrates can be made of glass, plastics or the like without any specific limitations. Materials for the plastic substrates can be selected from conventionally known materials without any specific limitations.

When the optical compensation layers, the polarizing plates or other optical members of the present invention are arranged on both surfaces of a liquid crystal cell, they can be the same or different in kind. Moreover, for forming a liquid crystal display, one or two or more layers of appropriate parts such as a prism array sheet, a lens array sheet, an optical diffuser and a backlight can be arranged at appropriate positions.

The liquid crystal display according to the present invention is not limited specifically as long as the liquid crystal panel of the present invention is included and used as its liquid crystal panel. Furthermore, it further may have a light source, and although there is no specific limitation on this light source, a flat surface light source emitting polarized light is preferable, for example, because light energy can be utilized effectively.

An example of the liquid crystal panel according to the present invention is illustrated below. The liquid crystal panel has, for example, a liquid crystal cell, the inclined optical compensation film of the present invention, a polarizer 2 and a transparent protective layer. One surface of the liquid crystal cell is laminated with the inclined optical compensation film, while the other surface of the inclined optical compensation film is laminated with the polarizer and the transparent protective layer in this order. The liquid crystal cell has a structure in which liquid crystal is retained between two liquid crystal cell substrates. In the case where the inclined optical compensation film is a laminate of a birefringent layer and a base as described earlier, the birefringent layer side can face the liquid crystal cell, while the base side can face the polarizer, for example, though there is no particular limitation on their arrangement.

For the liquid crystal display according to the present invention, it also is possible to further dispose a diffusion plate, an anti-glare layer, an antireflection film, a protective layer/plate, on the inclined optical compensation film on the viewing side. Alternatively, a retardation plate for compensation or the like can be disposed suitably between a liquid crystal cell and a polarizing plate in the liquid crystal panel.

Incidentally, the inclined optical compensation film and the polarizing plate according to the present invention are not limited to a use in the liquid crystal display described above but also can be used in self-light-emitting displays such as an organic electroluminescence (EL) display, a PDP, a plasma display (PD) and an FED (field emission display). When used in self-light-emitting flat displays, the polarizing plate of the present invention can be utilized as an antireflection filter because it can obtain circularly polarized light by setting $\Delta nd=\lambda/4$.

The following is a description of an electroluminescence (EL) display including the inclined optical compensation film or the polarizing plate of the present invention. The EL display according to the present invention has the inclined optical compensation film or the polarizing plate of the present invention and may be either an organic EL display or an inorganic EL display.

In recent years, for EL displays, it has been suggested to use an optical film such as a polarizer or a polarizing plate together with a $\lambda/4$ plate for preventing reflection from an electrode in a black state. The inclined optical compensation film and the polarizing plate of the present invention are very useful particularly when any of linearly polarized light, circularly polarized light and elliptically polarized light is emitted from the EL layer, or when obliquely emitted light is polarized partially even if natural light is emitted in the front direction.

The following description is directed to a typical organic EL display. In general, an organic EL display has a ruminant (organic EL luminant) that is prepared by laminating a transparent electrode, an organic luminant layer and a metal electrode in a certain order on a transparent substrate. Here, the organic luminant layer is a laminate of various organic thin films. Known examples thereof include a laminate of a hole injection layer made of triphenylamine derivative or the like and a luminant layer made of a phosphorous organic solid such as anthracene; a laminate of the ruminant layer and an electron injection layer made of perylene derivative or the like; or a laminate of the hole injection layer, the ruminant layer and the electron injection layer.

In general, the organic EL display emits light on the following principle: a voltage is applied to the anode and the cathode so as to inject holes and electrons into the organic ruminant layer, energy generated by the re-bonding of these holes and electrons excites the phosphor, and the excited phosphor emits light when it returns to the basis state. The mechanism of the re-bonding during the process is similar to that of an ordinary diode. This implies that current and the light emitting intensity exhibit a considerable nonlinearity accompanied with a rectification with respect to the applied voltage.

It is necessary for the organic EL display that at least one of the electrodes is transparent so as to obtain luminescence at the organic luminant layer. In general, a transparent electrode of a transparent conductive material such as indium tin oxide (ITO) is used for the anode. Use of substances having small work function for the cathode is important for facilitating the electron injection and thereby raising luminous efficiency, and in general, metal electrodes such as Mg—Ag, and Al—Li may be used.

In an organic EL display configured as described above, it is preferable that the organic luminant layer is made of a film that is extremely thin such as about 10 nm. Therefore, the organic luminant layer can transmit substantially whole light as the transparent electrode does. As a result, when the layer does not illuminate, a light beam entering from the surface of the transparent substrate and passing through the transparent electrode and the organic ruminant layer before being reflected at the metal layer comes out again to the surface of the transparent substrate. Thereby, the display surface of the organic EL display looks like a mirror when viewed from the outside.

The organic EL display according to the present invention includes, for example, the organic EL luminant formed by providing a transparent electrode on the surface of the organic ruminant layer and a metal electrode on the backside of the organic luminant layer, and preferably, an inclined optical compensation film or a polarizing plate according to the present invention is arranged on the surface of the transparent electrode. More preferably, a λ/4 plate is arranged between the polarizing plate and an EL device. By arranging the inclined optical compensation film or the polarizing film of the present invention as described above, the organic EL display has an effect of suppressing external reflection and improving visibility. It is also preferable that a retardation plate further is arranged between the transparent electrode and the optical film.

The retardation plate and the optical film (e.g., a polarizing plate etc.) function to polarize light which enters from outside and is reflected by the metal electrode, for example, and thus the polarization has an effect that the mirror of the metal electrode cannot be viewed from the outside.

Particularly, the mirror of the metal electrode can be blocked completely by forming the retardation plate with a quarter wavelength plate and adjusting an angle formed by the polarization directions of the polarizing plate and the retardation plate to be π/4. That is, the polarizing plate transmits only the linearly polarized light component among the external light entering the organic EL display. In general, the linearly polarized light is changed into elliptically polarized light by the retardation plate. However, when the retardation plate is a quarter wavelength plate and when the above-noted angle is π/4, the light is changed into circularly polarized light.

For example, this circularly polarized light passes through the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. As a result, the mirror of the metal electrode can be blocked completely as mentioned earlier.

EXAMPLES

The following is a more specific description of the present invention by way of an example and a comparative example, though the present invention is by no means limited to the examples below.

Example 1

Polyimide having a weight-average molecular weight (Mw) of 70,000 synthesized from 2,2'-bis(trifluoromethyl)-4,4',5,5'-biphenyl tetracarboxylic dianhydride and 2,2'-bis(trifluoromethyl)-4,4'-diaminobiphenyl was dissolved in cyclohexanone, thus preparing a 10 wt % polyimide solution. Then, the surface of a 75 μm thick PET film (manufactured by Toray Industries. Inc.; trade name S27) was coated with this polyimide solution. Thereafter, hot air was blown onto this coating film with a blower, thereby inclining polyimide in the coating film. The condition of this treatment was such that the air velocity was 20 m/sec, the air temperature was 100° C., the duration was 5 minutes and the distance between the surface of the coating film and the front end of the blower was 30 cm. The laminate of the PET film and the coating film was placed on a belt and sent out continuously at a speed of 2 m/minute, whereby the hot air was blown onto the laminate. Subsequently, by heating and drying at 150° C. for 5 minutes, the inclination and alignment of the polyimide on the PET film were fixed, thereby forming a 4 μm thick polyimide film on the PET film. Evaluation of the birefringent property of the polyimide film showed that a birefringent layer having a birefringence (Δn) of about 0.041 was obtained.

Figure 3:
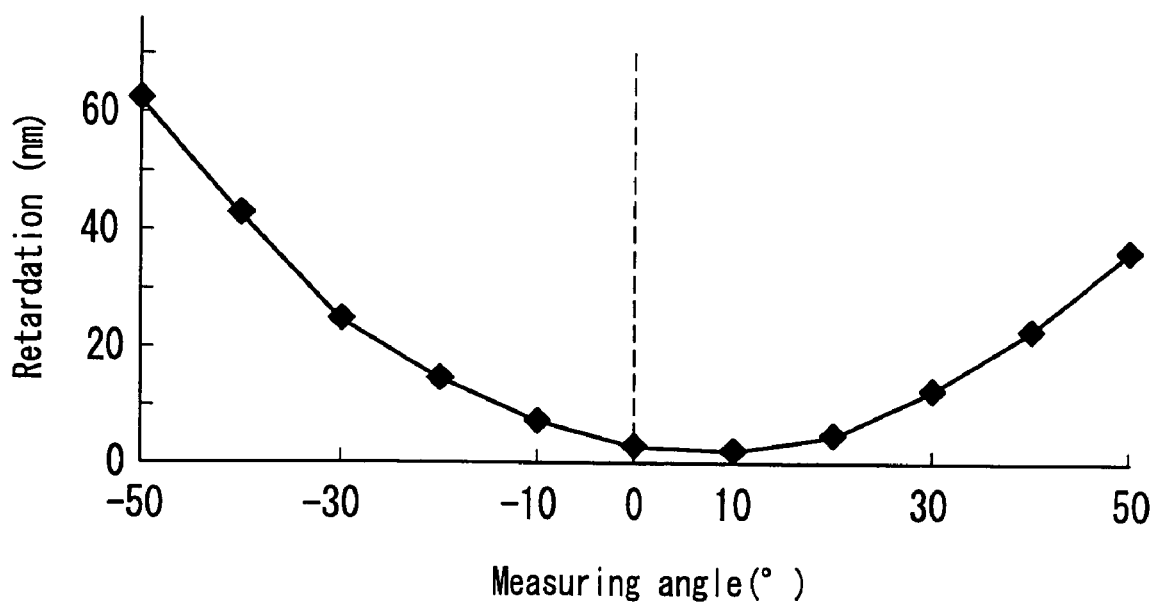
FIG. 3 is a graph showing the relationship between a retardation value in an inclined optical compensation film and a measuring angle in an example of the present invention.

The polyimide film was peeled off from the PET film, and then the retardation of this polyimide film at 590 nm was measured using a retardation meter (trade name KOBRA-21ADH; manufactured by Oji Scientific Instruments). The retardation measurement was carried out from the directions of measuring axes, where a normal line of the polyimide film was set to 0° and the normal line (0°) and axes inclined by −50° to +50° from the normal line toward a fast axis direction of the polyimide film were used as the measuring axes. FIG. 3 shows the result of the measurement. FIG. 3 is a graph showing the relationship between a measuring angle (an inclination angle) and a retardation value at each measuring angle, with a horizontal axis showing the angle and a vertical axis showing the retardation value.

As shown in this figure, a curve of the retardation value at measuring angles (−50° to +50°) in the case where the normal line was set to 0° was asymmetrical with respect to the vertical axis (indicated by a dotted line in the figure) passing through 0° (the normal line). Thus, this film was confirmed to be an inclined optical compensation film whose polyimide alignment was inclined. In addition, the minimum retardation value was shown at an angle inclined by about +10° from the normal line toward the fast axis direction.

Moreover, this polyimide film was laminated onto a commercially available polarizing plate (trade name HEG1425DU; manufactured by Nitto Denko Corporation). The resultant laminated polarizing plate further was mounted on a liquid crystal panel for a commercially available TN mode liquid crystal display so that the polyimide film and the liquid crystal panel face each other. Then, the contrast of this liquid crystal display was calculated in the following manner. The liquid crystal display was allowed to display a white image and a black image. Then, values of Y, x and y in an XYZ display system at viewing angles of 0° to 70° were measured respectively by trade name EZ Contrast 160D (manufactured by ELDIM SA.) for front, top, bottom, right and left parts of the display screen. From the value of Y in the white image ($Y_W$) and that in the black image ($Y_B$), the contrast "$Y_W/Y_B$" at each viewing angle was calculated. On the other hand, as Comparative example, the contrast at the above-noted viewing angles was examined in a liquid crystal display in which the above-mentioned commercially available polarizing plate alone was mounted instead of the laminated polarizing plate.

The result showed that the liquid crystal display with the laminated polarizing plate according to Example achieved a wider range of the viewing angles showing a contrast of at least 10, i.e., the viewing angle range expanded to +15° on both right and left sides, compared with the liquid crystal display only with the commercially available polarizing plate according to Comparative example.

Control Example 1

The surface of a glass plate was coated with a 1 wt % aqueous solution of polyvinyl alcohol (trade name NH-18; manufactured by The Nippon Synthetic Chemical Industry Co., Ltd.) with a spin coater, followed by drying at 120° C. for 5 minutes. In this way, a 0.5 μm thick PVA film was formed on the glass plate. Further, the surface of the PVA film was rubbed five times in one direction with a commercially available rubbing cloth, thus forming an alignment layer. The surface of this alignment layer was coated with a 10 wt % tetrachloroethylene solution of triphenylene-based discotic liquid crystal represented by the chemical formula below with a spin coater, followed by heating at 200° C. for 5 minutes, thereby aligning the liquid crystal material. By this heating treatment, a 2 μm thick inclined birefringent layer having a birefringence (Δn) of about 0.040 was formed on the alignment layer.

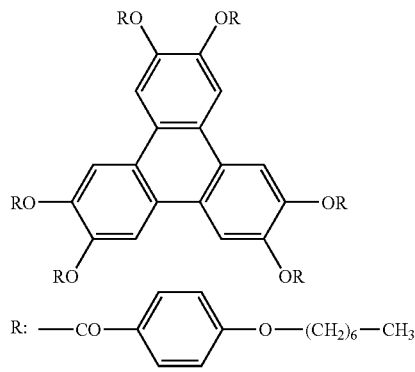

Figure 4:
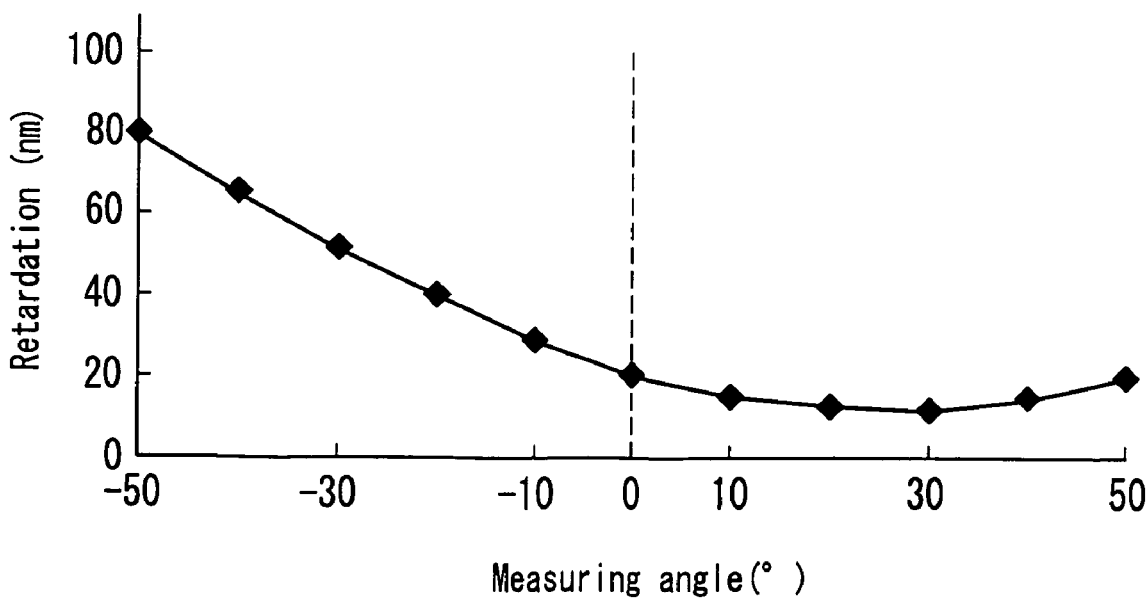
FIG. 4 is a graph showing the relationship between a retardation value in an inclined optical compensation film and a measuring angle in Control example.

Similarly to Example 1 described above, the retardation of this inclined birefringent layer of Control example 1 was measured. FIG. 4 shows the result of the measurement. Similarly to FIG. 3, FIG. 4 is a graph showing the relationship between the normal line—measuring axis angle and the retardation value at each measuring axis, with the horizontal axis showing the angle and the vertical axis showing the retardation value. As shown in FIG. 4, a curve of the retardation value at measuring angles (−50° to +50°) in the case where the normal line was set to 0° was asymmetrical with respect to the vertical axis (indicated by a dotted line in the figure) passing through 0° (the normal line). Also, the minimum retardation value was shown at an angle inclined by about +30° from the normal line toward the fast axis direction.

Furthermore, this birefringent layer was mounted on a commercially available TN mode liquid crystal display in a manner similar to that in Example 1. Consequently, it was confirmed to achieve a +15° wider region showing a contrast of at least 10 in both right and left directions compared with the case of mounting only the commercially available polarizing plate.

As becomes clear from the above results, although the shape of the graph of the retardation and the measuring angle of the inclined optical compensation film of Example and that of Control example were slightly different, they were both asymmetrical with respect to the vertical axis.

Additionally, the inclined optical compensation films produced in Example and Control example were stretched further. In the inclined optical compensation film of Control example, the inclination and alignment of liquid crystal molecules fell apart, so that the film became unusable as the inclined optical film. On the other hand, in the inclined optical compensation layer of Example, it was possible to vary the in-plane retardation further. This also indicates that the inclined optical compensation film of the present invention is useful because its optical characteristics further can be varied depending on the intended use, so that the applicable range can be expanded.

INDUSTRIAL APPLICABILITY

As described above, in accordance with the present invention, a new inclined optical compensation film that is useful especially for a TN mode liquid crystal display can be provided without using a liquid crystal material. Also, since a non-liquid crystal polymer is not affected by an alignment of a substrate, there is no limitation on the kinds of the substrate. Furthermore, even after being inclined and aligned, the non-liquid crystal polymer can be stretched and allowed to shrink, so that the design of optical characteristics can be varied further. This makes it possible to expand the range of intended use, and therefore, the inclined optical compensation film of the present invention is very useful as a retardation film.

The invention claimed is:
1. An inclined optical compensation film comprising:
a non-liquid crystal polymer;
wherein the non-liquid crystal polymer is inclined and aligned,
a retardation value measured from a direction of a measuring axis varies asymmetrically between a + side and a − side of a measuring angle with respect to the retardation value at 0°, when the 0° corresponds to a normal line of a surface of the inclined optical compensation film and the measuring angle denotes an angle between the normal line and the measuring axis (including 0°),
a birefringence (Δn) represented by the equation below that ranges from 0.001 to 0.5,

$$\Delta n = [\{(nx+ny)/2\} - nz] \cdot d/d$$

where Δn represents the birefringence of the inclined optical compensation film, nx, ny and nz respectively represent refractive indices in directions of an X axis, a Y axis and a Z axis in the inclined optical compensation film, with the X axis being an axial direction exhibiting a maximum refractive index within the surface of the inclined optical compensation film, the Y axis being an axial direction perpendicular to the X axis within the surface and the Z axis being a thickness direction perpendicular to the X axis and the Y axis, and d represents a thickness of the inclined optical compensation film, the non-liquid crystal polymer is at least one polymer selected from the group consisting of polyamide, polyimide, polyester, polyetherketone, polyamide imide and polyesterimide, the inclined optical compensation film is prepared from a coating film made of the non-liquid crystal polymer, and the thickness of the inclined optical compensation film is 0.5 to 20 μm.

2. The inclined optical compensation film according to claim 1, wherein the retardation value reaches its maximum value or minimum value on the + side or the − side of the measuring angle.

3. The inclined optical compensation film according to claim 1, wherein the measuring angle is −50° to +50°.

4. The inclined optical compensation film according to claim 3, wherein the retardation value reaches its maximum value or minimum value at the measuring angle of −2° to −50° or the measuring angle of +2° to +50°.

5. The inclined optical compensation film according to claim 1, wherein the measuring axis includes the normal line and an axis inclined from the normal line, and the axis inclined from the normal line is inclined in a slow axis direction of the inclined optical compensation film.

6. The inclined optical compensation film according to claim 1, wherein the measuring axis includes the normal line and an axis inclined from the normal line, and the axis inclined from the normal line is inclined in a fast axis direction of the inclined optical compensation film.

7. The inclined optical compensation film according to claim 1, used in a liquid crystal display whose display system is a TN (Twisted Nematic) mode or an OCB (Optically Aligned Birefringence) mode.

8. The inclined optical compensation film according to claim 7, wherein a region showing a contrast of at least 10 in the liquid crystal display whose display system is the TN mode is expanded to 10° or more in right and left directions of a display screen.

9. The inclined optical compensation film according to claim 1, used in a liquid crystal display whose liquid crystal has a monodomain alignment.

10. A polarizing plate comprising:
a polarizer; and
an optical compensation film;
wherein the optical compensation film is the inclined optical compensation film according to claim 1.

11. An image display apparatus comprising:
the polarizing plate according to claim 10.

12. A liquid crystal panel comprising:
a liquid crystal cell; and
an optical member;
wherein the optical member is arranged on at least one surface of the liquid crystal cell, and
the optical member is the polarizing plate according to claim 10.

13. An image display apparatus comprising the polarizing plate according to claim 10.

14. A liquid crystal panel comprising:
a liquid crystal cell; and
an optical member;
wherein the optical member is arranged on at least one surface of the liquid crystal cell, and
the optical member is the inclined optical compensation film according to claim 1.

15. A liquid crystal display comprising:
the liquid crystal panel according to claim 14.

16. The liquid crystal display according to claim 15, whose display system is a TN mode or an OCB mode.

17. The liquid crystal display according to claim 15, whose liquid crystal has a monodomain alignment.

18. An image display apparatus comprising the inclined optical compensation film according to claim 1.

19. The image display apparatus according to claim 18, which is at least one selected from the group consisting of a liquid crystal display, an electroluminescence (EL) display, a plasma display (PD) and an FED (field emission display).

20. An inclined optical compensation film produced by a method for producing an inclined optical compensation film, comprising:

coating a base with at least one nonliquid crystal polymer selected from the group consisting of polyamide, polyimide, polyester, polyetherketone, polyamide imide and polyesterimide, thereby forming a coating film; and inclining and aligning the nonliquid crystal polymer in the coating film, thereby forming an inclined optical compensation film;

wherein the non-liquid crystal polymer is inclined and aligned by applying an external force to the coating film so that the nonliquid crystal polymer is inclined and aligned, and the inclined optical compensation film has a retardation value measured from a direction of a measuring axis varies asymmetrically between a + side and a − side of a measuring angle with respect to the retardation value at 0°, when the 0° corresponds to a normal line of a surface of the inclined optical compensation film and the measuring angle denotes an angle between the normal line and the measuring axis (including 0°), and a birefringence (Δn) represented by the equation below that ranges from 0.001 to 0.5, $$\Delta n = [\{(nx+ny)/2\} - nz] \cdot d/d$$

where Δn represents the birefringence of the inclined optical compensation film, nx, ny and nz respectively represent refractive indices in directions of an X axis, a Y axis and a Z axis in the inclined optical compensation film, with the X axis being an axial direction exhibiting a maximum refractive index within the surface of the inclined optical compensation film, the Y axis being an axial direction perpendicular to the X axis within the surface and the Z axis being a thickness direction perpendicular to the X axis and the Y axis, and d represents a thickness of the inclined optical compensation film.

21. A polarizing plate comprising:
a polarizer; and
an optical compensation film;
wherein the optical compensation film is the inclined optical compensation film according to claim 20.

22. A liquid crystal panel comprising:
a liquid crystal cell; and
an optical member;
wherein the optical member is arranged on at least one surface of the liquid crystal cell, and
the optical member is the polarizing plate according to claim 21.

23. An image display apparatus comprising the polarizing plate according to claim 21.

24. A liquid crystal panel comprising:
a liquid crystal cell; and
an optical member;
wherein the optical member is arranged on at least one surface of the liquid crystal cell, and
the optical member is the inclined optical compensation film according to claim 20.

25. A liquid crystal display comprising:
the liquid crystal panel according to claim 24.

26. An image display apparatus comprising the inclined optical compensation film according to claim 20.

27. The image display apparatus according to claim 26, which is at least one selected from the group consisting of a liquid crystal display, an electroluminescence (EL) display, a plasma display (PD) and an FED (field emission display).

* * * * *